US012411458B2

(12) United States Patent
Leskerpit et al.

(10) Patent No.: US 12,411,458 B2
(45) **Date of Patent: *Sep. 9, 2025**

(54) DEVICE FOR MANUALLY CONTROLLING A MECHANISM FOR A TIMEPIECE

(71) Applicant: Blancpain SA, Le Brassus (CH)

(72) Inventors: Julien Leskerpit, Pontarlier (FR); Cédric Reymond, Les Bioux (CH); Jérôme Favre-Bulle, La Sarraz (CH)

(73) Assignee: Blancpain SA, Le Brassus (CH)

( * ) Notice: Subject to any disclaimer, the term of this patent is extended or adjusted under 35 U.S.C. 154(b) by 537 days.

This patent is subject to a terminal disclaimer.

(21) Appl. No.: 17/820,259

(22) Filed: Aug. 17, 2022

(65) Prior Publication Data

US 2023/0084357 A1 Mar. 16, 2023

(30) Foreign Application Priority Data

Sep. 10, 2021 (EP) .................................... 21196126

(51) Int. Cl.
*G04B 27/00* (2006.01)
*G04B 19/22* (2006.01)
*G04B 19/25* (2006.01)

(52) U.S. Cl.
CPC ........... *G04B 27/001* (2013.01); *G04B 19/22* (2013.01); *G04B 19/25* (2013.01)

(58) Field of Classification Search
None
See application file for complete search history.

(56) References Cited

U.S. PATENT DOCUMENTS 6,270,251 B1 * 8/2001 Bron .................... G04B 27/004 368/320
10,216,146 B2 * 2/2019 Chabloz ................. G04B 13/00
2019/0025761 A1 * 1/2019 Chabloz ................. G04B 13/00

FOREIGN PATENT DOCUMENTS

CH 250947 A * 9/1947 ........... G04B 27/005
CH 504044 A * 11/1970 ............... G04F 7/06

(Continued)

OTHER PUBLICATIONS

Oxford English Dictionary, s.v. "stop-finger (n.)," Dec. 2024, https://doi.org/10.1093/OED/2402433008. (Year: 2024).*

(Continued)

*Primary Examiner* — Regis J Betsch
*Assistant Examiner* — Michael James Walker
(74) *Attorney, Agent, or Firm* — Oblon, McClelland, Maier &Neustadt, L.L.P.

(57) ABSTRACT

A device for manually controlling a timepiece mechanism includes two counteracting manual corrector actuators to be operated by a user and to control a correction wheel set in opposing movements. Each actuator sets in motion an associated corrector having a beak to bear against a relief of the correction wheel set and to cause the correction wheel set to move when the actuator is moved over its full path of travel. The manual control device includes a locking lever mechanism arranged to prohibit an action of one of the actuators on the correction wheel set when the other actuator is engaged and interacting with the correction wheel set. The locking lever mechanism includes a locking lever driven in rotation during the engagement of one of the actuators to limit the travel of the other actuator and to prevent the corrector associated therewith from accessing the correction wheel set.

18 Claims, 6 Drawing Sheets

(56) References Cited

FOREIGN PATENT DOCUMENTS

| | | | | | |
|---|---|---|---|---|---|
| CH | 699785 | A2 * | 4/2010 | ............. | G04B 19/23 |
| CH | 701671 | A2 * | 2/2011 | ........... | G04B 27/001 |
| CH | 699785 | B1 * | 2/2014 | ............. | G04B 19/23 |

OTHER PUBLICATIONS

Federation of the Swiss Watch Industry. (n.d.). Dictionary of horology. FH. https://dictionary.fhs.swiss/?I=en Definition of sautoir (Year: 2025).*

European Search Report Issued Feb. 18, 2022 in European Application 21196126.3 Filed on Sep. 10, 2021 (with English Translation of Categories of Cited Documents), 3 pages.

* cited by examiner

DEVICE FOR MANUALLY CONTROLLING A MECHANISM FOR A TIMEPIECE

CROSS-REFERENCE TO RELATED APPLICATION

This application claims priority to European Patent Application No. 21196126.3 filed on Sep. 10, 2021, the entire disclosure of which is hereby incorporated herein by reference.

TECHNICAL FIELD OF THE INVENTION

The invention relates to a device for manually controlling a mechanism fora timepiece, comprising manual corrector actuators, which are arranged to be operated by a user, and to control movements of one and the same wheel set in opposite directions.

The invention further relates to a timepiece, comprising at least one mechanism, at least one correction wheel set whereof is arranged to be controlled by at least one such manual control device.

The invention relates to the field of horological mechanisms, in particular complication mechanisms such as calendar mechanisms or time zone mechanisms, and the setting mechanisms associated therewith, allowing the timepiece to be adjusted by the user.

TECHNOLOGICAL BACKGROUND

In the horological field, it is not uncommon to propose watches having complications, such as calendar mechanisms, or so-called GMT mechanisms displaying time zones, which the user can easily correct using manual corrector actuators, such as push buttons for example.

In this particular example of a time zone mechanism, watches exist with two separate push buttons for correcting the time zones in both directions (for bringing the time zone forward and backward). For example, one solution is to use two correction actuators that act on one and the same time zone correction wheel in a counteracting manner.

When the user actuates a manual actuator associated with a corrector, in a first step, this manual actuator pushes this corrector via a stud driven into the manual actuator until it comes into contact with the bottom of the toothing of the time zone correction wheel. If the user continues to push the control, the corrector drives the tooth of the time zone correction wheel until it reaches abutment, in a second step. When the user releases the manual actuator, the return spring of the corrector releases the corrector from the toothing of the time zone correction wheel in a third step, and brings the corrector and the manual actuator thereof back into abutment in a rest position in a fourth step. The two counteracting correctors work in the same way, and act on the same time zone correction wheel. Thus, if the user actuates the correctors via the manual actuators thereof at the same time, this action can result in the teeth of the time zone correction wheel breaking and/or in other damage within the mechanism.

In order to overcome this drawback, the Swiss patent document CH 699 785 proposes using a safety lock to neutralise any simultaneous activation of the two manual actuators. However, the proposed architecture gives priority or precedence to one of the manual corrector actuators over the other. Thus, in the case of a simultaneous actuation of the two manual corrector actuators, such a mechanism prioritises either moving the local hour hand forward on hour, or moving the local hour hand backward one hour, depending on the direction in which the safety lock is mounted within the mechanism.

SUMMARY OF THE INVENTION

The purpose of the invention is to secure a correction mechanism comprising two counteracting correctors acting on the same mechanism, and more specifically on the same correction wheel set, in order to avoid breakage when the user presses the two correction push buttons at the same time.

The invention further aims to propose an architecture of a manual control device for a correction mechanism that does not prioritise a particular manual corrector actuator, such that the only consequence in the event of the simultaneous actuation of the two manual corrector actuators is the absence of any correction, in contrast to devices of the prior art.

The invention will be illustrated and described hereinbelow via a non-limiting application in the case of a time zone correction mechanism comprising two manual corrector actuators, for example push buttons.

For this purpose, the invention relates to a device for manually controlling a mechanism for a timepiece, comprising two counteracting manual corrector actuators, arranged to be operated by a user and to control one and the same correction wheel set in opposing movements, each of the two manual corrector actuators setting in motion an associated corrector having a beak which is configured to bear against a relief of said correction wheel set and to cause said correction wheel set to move when said manual corrector actuator is moved over its full path of travel under the action of the user, said manual control device comprises a locking lever mechanism arranged to prohibit an action of one of the two manual corrector actuators on said correction wheel set when the other of the two manual corrector actuators is engaged and interacting with said correction wheel set, characterised in that said locking lever mechanism comprises a locking lever configured to be driven in rotation during the engagement of one of the two manual corrector actuators, in order to limit the travel of the other of the two counteracting manual corrector actuators and to prevent the corrector associated therewith from accessing said correction wheel set.

In addition to the features mentioned in the preceding paragraph, the device for manually controlling a mechanism for a timepiece according to the invention can have one or more complementary features from among the following, considered either on an individual basis or according to any combination technically possible:

- each of the two manual corrector actuators pivots about a hinge pin;
- each of the two manual corrector actuators comprises an actuating stud which sets in motion said associated corrector by the pivoting of each of the two manual corrector actuators about said hinge pin;
- each associated corrector comprises an oblong guide groove cooperating with said hinge pin of the corresponding manual corrector actuator, said oblong groove being configured to guide the movement of said associated corrector during the pivoting of said corresponding manual corrector actuator;
- said oblong groove is configured to guide said associated corrector, in rotation and translation, during the pivoting of said corresponding manual corrector actuator;

at least one of the two manual corrector actuators comprises an angular travel limit member;

the angular travel limit member is formed by a limiting groove made in the body of said at least one of the two manual corrector actuators and by a limiting pin carried by a plate carrying the manual control device;

said locking lever constitutes a safety lever, said locking lever comprising a first end having a first stop finger and a second end, opposite the first end, which has a second stop finger, the first and the second stop fingers being configured to cooperate in abutment, respectively with a manual corrector actuator from among the two manual corrector actuators;

the first stop finger and the second stop finger have an identical shape and/or carry out an identical function;

each of the two manual corrector actuators comprises:

a first bearing profile configured to form a stop profile in cooperation with the first stop finger or the second stop finger and to prevent said manual corrector actuator considered from rotating;

a second bearing profile configured to form an escapement profile on which the first stop finger or the second stop finger slides so as to allow said manual corrector actuator considered to partially rotate;

said first bearing profiles of the two manual corrector actuators are arranged relative to one another in a substantially aligned manner, and in that the first stop finger and the second stop finger respectively bear against said first bearing profile of each of said two manual corrector actuators when each of said two manual corrector actuators are actuated simultaneously by the user;

said second bearing profiles of said two manual corrector actuators are arranged opposing one another so as to form an acute angle with the vertex of the acute angle pointing towards the mechanism;

the locking lever is made in one piece or of a plurality of hinged parts;

the locking lever is mounted such that it pivots about a shaft mounted on a plate carrying said manual control device;

the locking lever and the two manual corrector actuators are coplanar;

the two manual corrector actuators and/or the associated correctors extend in two different parallel planes, advantageously parallel to the plane of the mechanism;

the manual control device comprises a first elastic return means and a second elastic return means, each of said elastic return means being configured to push one of the two manual corrector actuators back into an inactive rest position, the first elastic return means and/or said second elastic return means cooperating directly with an associated corrector.

The invention further relates to a timepiece, comprising at least one mechanism, at least one correction wheel set whereof is arranged to be controlled by at least one such manual control device.

Advantageously, said correction wheel set is held in position by a jumper subjected to the action of at least one spring.

Advantageously, said at least one mechanism is a time zone mechanism and in that said correction wheel set is a time zone correction wheel.

Advantageously, said at least one mechanism is a calendar mechanism and in that said correction wheel set is a date wheel or ring.

BRIEF DESCRIPTION OF THE FIGURES

The purposes, advantages and features of the invention will be better understood upon reading the following detailed description given with reference to the accompanying drawings, in which:

FIG. 7 shows a first case where the correctors are actuated at the same time. When the manual corrector actuators are actuated at the same time, they come into contact with the safety lever. As each manual corrector actuator counteracts the other on the safety lever, the rotation thereof is blocked. The only way to carry out a correction is to release one of the manual corrector actuators. In such a case, the two corrector beaks cannot interact with the correction wheel set when they are actuated at the same time;

FIGS. 8 and 9 show a second case, where the correctors are actuated one after the other;

FIG. 8 shows a first stage, wherein a first corrector on the left-hand side in the figure, which acts in the direction of an increasing correction, is actuated by the first manual corrector actuator, until the corrector beak comes into contact with a tooth of the toothing of the correction wheel set. In this position, the first corrector has driven the safety lever over the maximum travel thereof: the distance between the safety lever and the second manual corrector actuator is very small and prevents the rotation thereof;

FIG. 9 shows the continuation of the movement, if the user continues to push the first manual corrector actuator until driving the correction wheel set. The safety lever remains in the same position and prevents the rotation of the second manual corrector actuator. The two corrector beaks cannot interact with the correction wheel set at the same time;

In all figures, common elements bear the same reference numerals unless indicated otherwise.

DETAILED DESCRIPTION OF THE INVENTION

Figure 13:
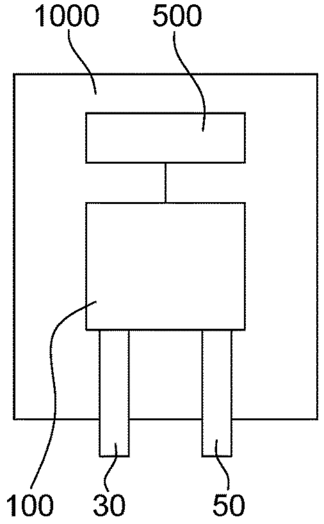
FIG. 13 is a block diagram showing a timepiece comprising a mechanism, a correction wheel set whereof is arranged to be controlled by such a manual control device comprising two manual corrector actuators.

As diagrammatically shown in FIG. 13, the invention relates to a device 100 for manually controlling a mechanism 500 for a timepiece 1000, comprising manual corrector actuators 30, 50, which are arranged to be operated by a user, and to control one and the same wheel set 10 moving in opposite directions.

Figure 1:
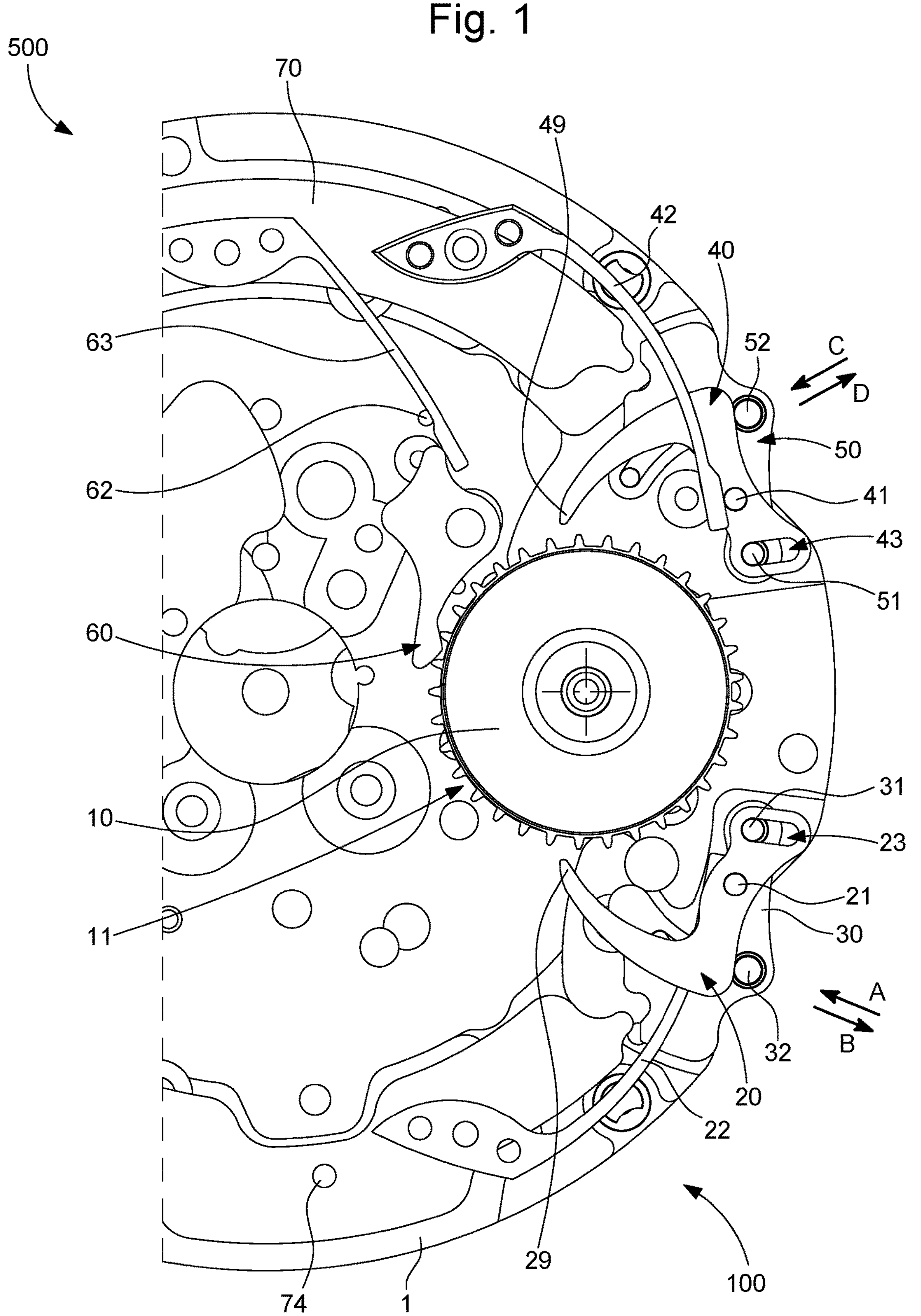
FIG. 1 diagrammatically shows a plan view of a time zone correction mechanism in a rest position, comprising a correction wheel set that can be driven in two opposite directions by counteracting correctors operated by separate manual corrector actuators.

The invention is described here in a non-limiting application in the case of a time zone correction mechanism, shown in FIG. 1, comprising two counteracting manual corrector actuators 30, 50, which are in this case more particularly control push buttons, which tend to cause the correction wheel set 10, which in this case is a time zone correction wheel, to rotate in two opposite directions (clockwise and anti-clockwise).

A first manual corrector actuator 30 can be directly operated by a user via a pushing action pushing in a first direction A. The first manual corrector actuator 30 is mounted such that it pivots about a first hinge pin 31 driven into a plate 1 of the mechanism 500, such that under the action of the user, the first manual corrector actuator 30 pivots about the first hinge pin 31.

The manual control device 100 further comprises a first corrector 20 that is hinged relative to the first manual corrector actuator 30. To this end, the first corrector 20 comprises a first oblong guide groove 23 configured to cooperate with the first hinge pin 31 so as to allow the first corrector 20 to be hinged relative to the first manual corrector actuator 30.

The first oblong groove 23 is configured to guide the movement of the first corrector when the first manual corrector actuator 30 is pivoting, in a rotational and translational movement.

The first manual corrector actuator 30 comprises a first actuating stud 32 that is, for example, driven into the body of the first manual corrector actuator 30. The first actuating stud 32 allows the pushing action exerted on the first manual corrector actuator 30 by the user to be transmitted to the first corrector 20.

The cooperation between the first oblong groove 23 and the first hinge pin 31 limits the relative travel between the first manual corrector actuator 30 and the first corrector 20.

The first manual corrector actuator 30 tends to be pushed back, either directly or indirectly, in a second direction B that is opposite the first direction A, into an inactive rest position by a first elastic return means 22, in this case constituted by a spring, although not limited thereto.

In the example embodiment shown, the first elastic return means 22 bears against the first corrector 20, and more particularly against a first spring pin 21 driven into the body of the first corrector 20. Thus, thanks to this architecture, the first elastic return means 22 makes it possible to push back, in a second direction B opposite the first direction A, both the first corrector 20 and the first manual corrector actuator 30 into an inactive rest position.

According to an alternative embodiment, the first elastic return means 22 could also be formed by two independent return springs, a first spring acting on the first corrector 20 and a second spring acting on the first manual corrector actuator 30.

The first corrector 20 comprises a first corrector beak 29 which is arranged to cooperate with a relief of the correction wheel set 10, in this case formed by a time zone correction wheel. The relief of the correction wheel set 10 is, for example, a tooth 11 of the toothing of the correction wheel set 10. Advantageously, the first actuating stud 32 can also be arranged to constitute an abutment for limiting the angular travel of the first corrector 20.

According to an alternative embodiment, the correction wheel set 10 could be constituted by a correction star wheel or other element. In such a case, the first beak 29 is thus arranged to cooperate with a branch, an arm, a catch, or other element comprised in the correction wheel set 10 considered. The correction wheel set 10 is conventionally held in position by a correction wheel set jumper 60 which is subjected to the action of a jumper spring 63 bearing against a jumper pin 62.

Similarly, the manual control device 100 comprises a second manual corrector actuator 50 which can be directly operated by a user via a pushing action pushing in a third direction C. The second manual corrector actuator 50 is mounted such that it pivots about a second hinge pin 51 driven into the plate 1 of the mechanism 500, such that under the action of the user, the second manual corrector actuator 50 pivots about the second hinge pin 51.

The manual control device 100 further comprises a second corrector 40 that is hinged relative to the second manual corrector actuator 50. To this end, the second corrector 40 comprises a second oblong guide groove 43 configured to cooperate with the second hinge pin 51 so as to allow the second corrector 40 to be hinged relative to the second manual corrector actuator 50.

The second oblong groove 43 is configured to guide the movement of the second corrector 40 when the second manual corrector actuator 50 is pivoting, in a rotational and translational movement.

The second manual corrector actuator 50 comprises a second actuating stud 52 that is, for example, driven into the body of the second manual corrector actuator 50. The second actuating stud 52 allows the pushing action exerted on the second manual corrector actuator 50 by the user to be transmitted to the second corrector 40.

The cooperation between the second oblong groove 43 and the second hinge pin 51 limits the relative travel between the second manual corrector actuator 50 and the second corrector 40. The second manual corrector actuator 50 tends to be pushed back, either directly or indirectly, in a fourth direction D that is opposite the third direction C, into an inactive rest position by a second elastic return means 42, in this case constituted by a spring, although not limited thereto.

In the example embodiment shown, the second elastic return means 42 bears against the second corrector 40, and more particularly against a second spring pin 41 driven into the body of the second corrector 40. Thus, thanks to this architecture, the second elastic return means 42 makes it possible to push back, in a fourth direction D opposite the third direction C, both the second corrector 40 and the second manual corrector actuator 50 into an inactive rest position.

According to an alternative embodiment, the second elastic return means 42 could also be formed by two independent return springs, a first spring acting on the second corrector 40 and a second spring acting on the second manual corrector actuator 50.

This second corrector 40 comprises a second corrector beak 49 which is arranged to cooperate with a relief of the correction wheel set 10, for example a tooth 11 of the toothing of the correction wheel set 10. Advantageously, the second actuating stud 52 can also be arranged to constitute an abutment for limiting the angular travel of the second corrector 40.

Figure 2:
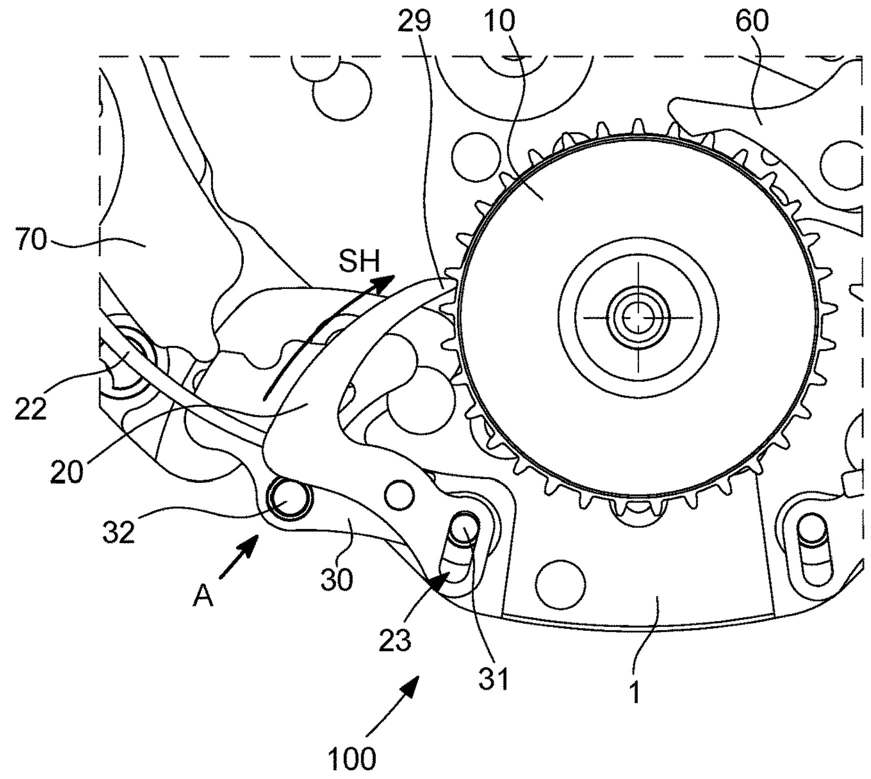
FIG. 2 diagrammatically shows a plan view of a detail of the mechanism in FIG. 1, and illustrates a first step corresponding to a push imparted by the user on a first manual corrector actuator, which drives a first corrector in the clockwise direction, so as to come to bear against the bottom of the toothing on the correction wheel set.

FIG. 2 more particularly shows a first step corresponding to a push imparted by the user on the first manual corrector actuator 30 in the first direction A. This push causes the first corrector 20 to rotate, which pivots in the direction SH, and comes to bear against the bottom of the toothing on the correction wheel set 10. In the representation shown in FIG. 2, the direction SH corresponds to the clockwise direction.

Figure 3:
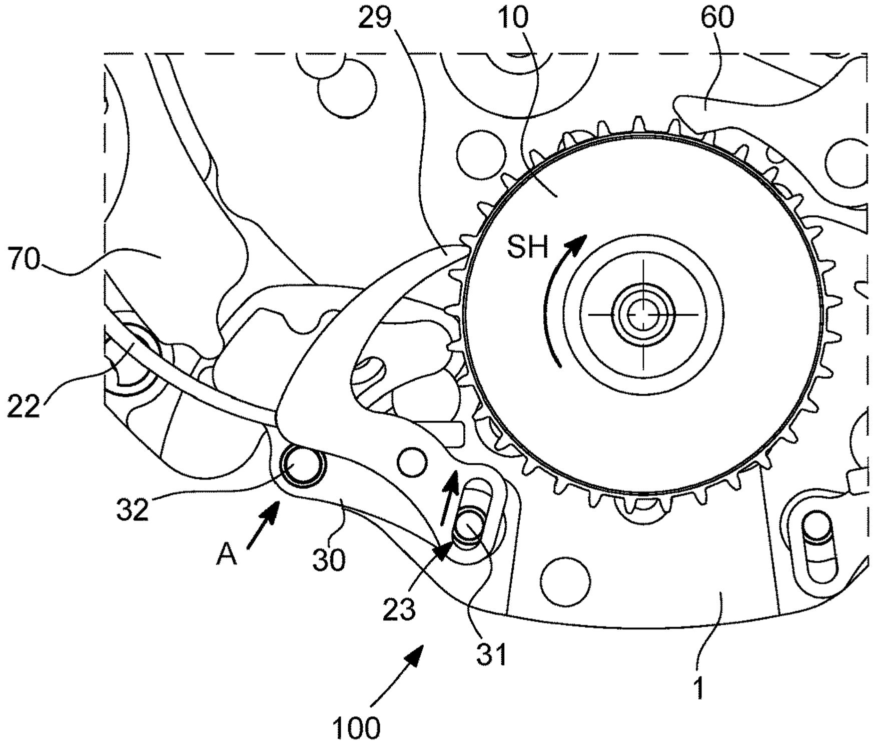
FIG. 3 shows, similarly to FIG. 2, a second step where the push is exerted on the first manual corrector actuator until it reaches a position of abutment, and during which the correction wheel set pivots in the clockwise direction.

FIG. 3 more particularly shows a second step which takes place when the first corrector 20 comes to bear against the bottom of the toothing on the correction wheel set 10. In this second step, the push is exerted so as to displace, in a substantially rectilinear manner, the first corrector 20 into a stop position of the first manual corrector actuator 30, and during which the displacement of the first corrector 20 initiates a pivoting of the correction wheel set 10 in the direction SH, which is the clockwise direction in the example embodiment shown.

It should be noted that in our non-limiting example embodiment, the direction of rotation of the first corrector 20 corresponds to the direction of rotation of the correction wheel set 10, the first corrector 20 acting directly on the correction wheel set 10 and not via an intermediate element or gear train.

However, an intermediate element could optionally be used between the corrector 20 and the correction wheel set 10 such that the rotation of the first corrector 20 drives the correction wheel set 10 in a direction opposite to the rotation of the first corrector 20.

Figure 4:
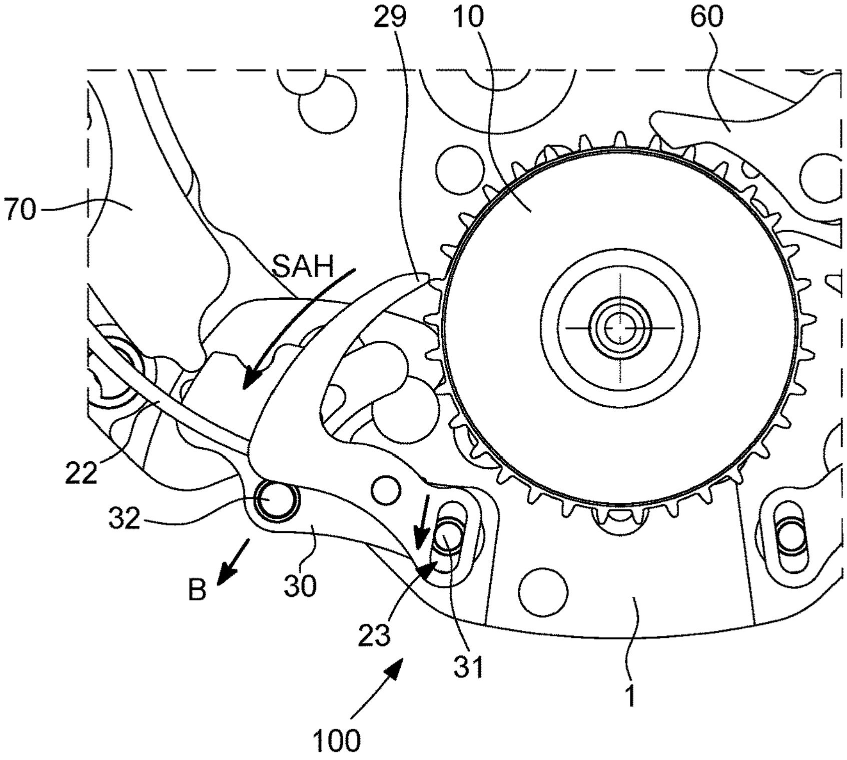
FIG. 4 shows, similarly to FIG. 2, the release, by the user, of the first manual corrector actuator, which, under the action of a first elastic return means constituted by a spring, pivots, together with the first corrector, in the anti-clockwise direction, so as to move the beak thereof out of the toothing of the correction wheel set.

FIG. 4 shows a third step consisting of the release, by the user, of the first manual corrector actuator 30, which, under the action of the first elastic return means 22, pivots, together with the first corrector 20, in a second direction SAH, corresponding in this example embodiment to the anti-clockwise direction, so as to move the first beak 29 out of the toothing of the correction wheel set 10.

Figure 5:
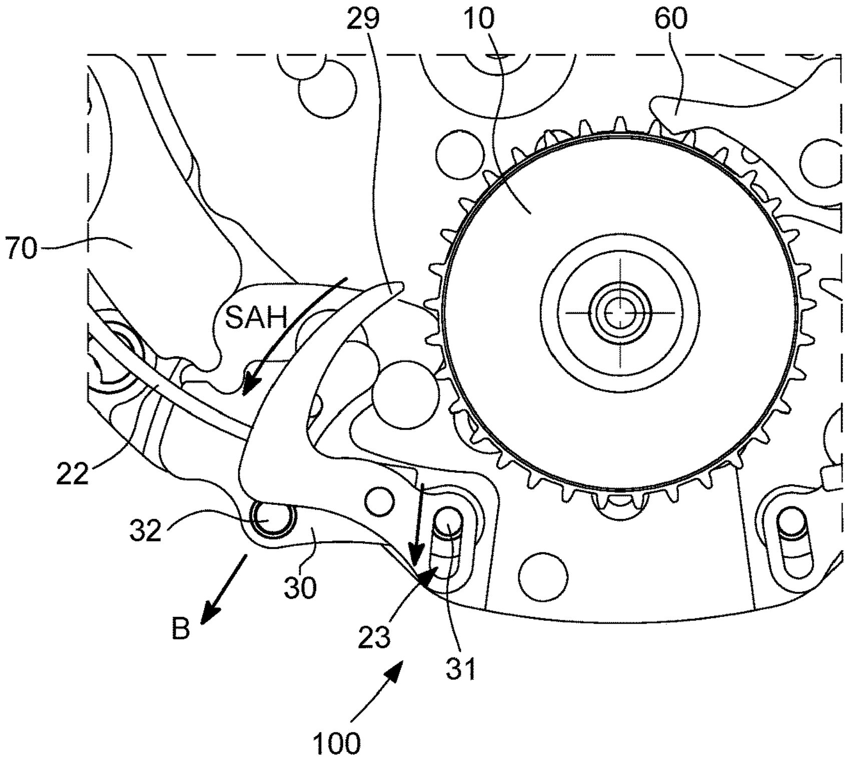
FIG. 5 shows, similarly to FIG. 2, the full release of the first manual corrector actuator, which returns to abutment in the rest position in FIG. 1.

FIG. 5 shows a fourth step corresponding to the full release of the first manual corrector actuator 30 and to the repositioning of the first manual corrector actuator 30, which returns to abutment in a rest position.

The functioning of the second manual corrector actuator 50 and of the second corrector 40 associated therewith is similar to the functioning of the first manual corrector actuator 30 and of the first corrector 20, as described with reference to FIGS. 2 to 5. The proposed alternative embodiments of the first manual corrector actuator 30 and its first corrector 20 are also applicable to the second manual corrector actuator 50 and to its second corrector 40.

Advantageously, the two correctors 20, 50 are counteracting correctors that work in the same way, and act on the same correction wheel set 10.

Advantageously, the two correctors 20, 50 act symmetrically on the same correction wheel set 10.

Advantageously, the manual control device 100 further comprises means for neutralising two simultaneous counteracting corrections.

Moreover, according to the invention, the manual control device 100 comprises a locking lever mechanism, which is arranged to prohibit an action by one of the manual corrector actuators 30, 50, on the correction wheel set 10 when the other one of the counteracting manual corrector actuators 30, 50 is interacting with the correction wheel set 10.

According to the invention, each manual corrector actuator 30, 50 tends to be directly or indirectly pushed back into an inactive rest position by an elastic return means 22, 42, which constitutes the sole elastic return means of the mechanism connecting the manual corrector actuator 30, 50 considered to the correction wheel set 10. Moreover, each manual corrector actuator 30, 50, is hinged with a corrector 20, 40, which comprises a beak 29, 49, which is arranged so as to bear against a relief of the correction wheel set 10 in order to make it move over a full path of travel of the manual corrector actuator 30, 50, under the action of the user.

The locking lever mechanism can comprise a locking lever 70, which is arranged to be driven during a movement of one of the manual corrector actuators 30, 50, and to limit the travel of the other one of the manual corrector actuators 50, 30, and thereby prevent the corrector 40, 20 associated therewith from accessing the correction wheel set 10.

Advantageously, the locking lever 70 is driven such that it rotates during a movement of one of the manual corrector actuators 30, 50.

In a first alternative embodiment, the locking lever 70 is in one piece.

In a second alternative embodiment, the locking lever 70 is made of a plurality of parts that are hinged to one another.

In a third alternative embodiment, the locking lever 70 is made of a plurality of parts, which are arranged to bear against one another upon an action of a user on one of the manual corrector actuators 30, 50.

Such a locking lever 70 is mounted such that it can move in rotation about an axis perpendicular to the plate 1, and forms a safety lever to ensure that the correctors 20, 40 do not simultaneously drive the correction wheel set 10, for example the time zone correction wheel in our non-limiting example application.

Such a locking lever 70 is configured such that it does not prioritise a specific manual corrector actuator 30, 50 as is the case with manual control devices of the prior art. Thus, the manual control device 100 according to the invention allows the manual corrector actuator actuated first by the user to be prioritised, and not a manual corrector actuator that was predefined during the design phase. The manual control device according to the invention thus allows no priority to be given to either the forward or backward corrector during the design phase.

Figure 6:
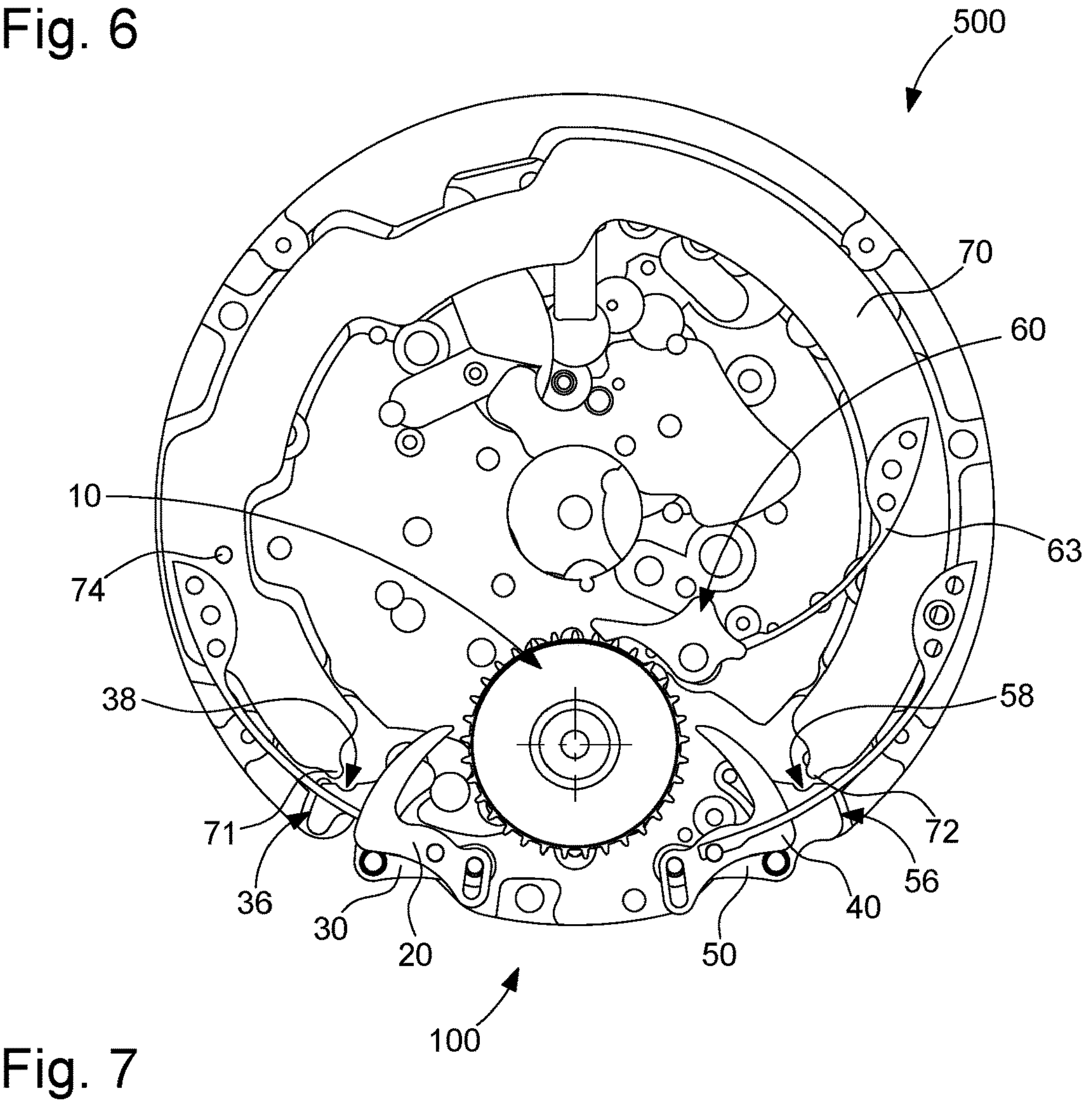
FIG. 6 diagrammatically shows a plan view, similar to FIG. 1, of a correction mechanism according to the invention, which comprises a locking lever, which is a safety lever, making it possible to ensure that the correctors do not drive the correction wheel set at the same time. This safety lever is, in this case, an annular sector, the distal ends whereof are arranged to cooperate with the manual corrector actuators, although it is not limited thereto.

The locking lever 70 is shown in its entirety more particularly in FIG. 6.

FIG. 6 in particular shows the manual control device 100 and the locking lever mechanism in the rest position, in the absence of any action by the user, in the same respect as in FIG. 1.

More particularly, the locking lever 70 forms a lever having, at the opposite ends thereof, stop fingers 71, 72, each of the stop fingers 71, 72 being arranged to cooperate with while bearing against a portion of the manual corrector actuators 30, 50.

The two opposite ends of the locking lever 70 have an identical shape and carry out the same function.

Each manual corrector actuator 30, 50 further comprises a plurality of bearing profiles allowing interaction with the locking lever 70, and more particularly with the stop fingers 71, 72, depending on the actions of the user.

Figure 7:
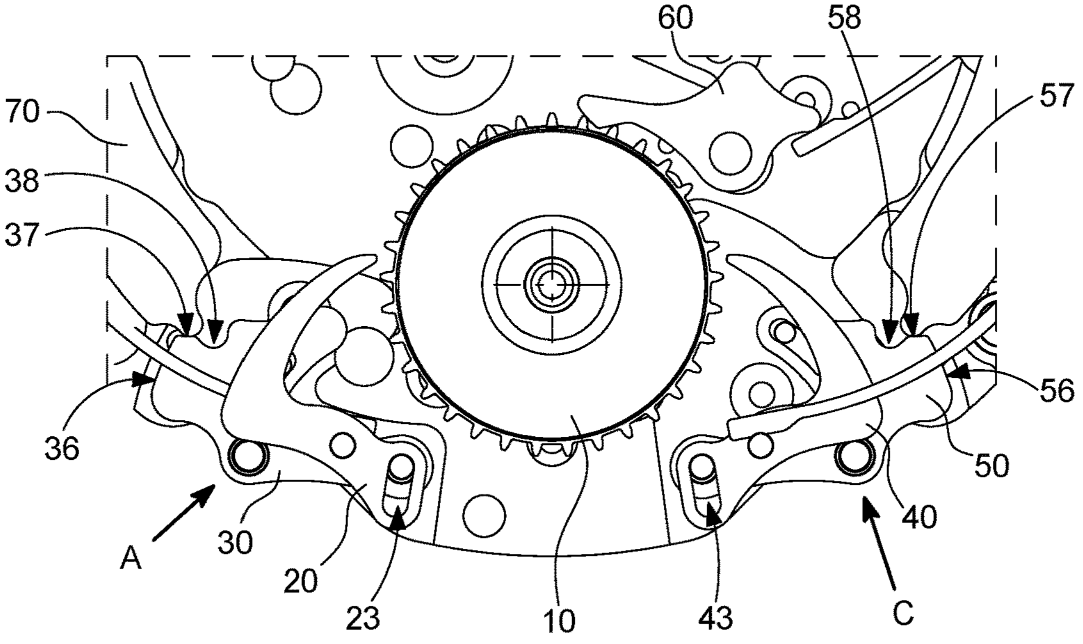
FIGS. 7 to 9 diagrammatically show a partial, plan view of the correction mechanism in FIG. 6 and illustrate the functioning thereof.
Figure 8:
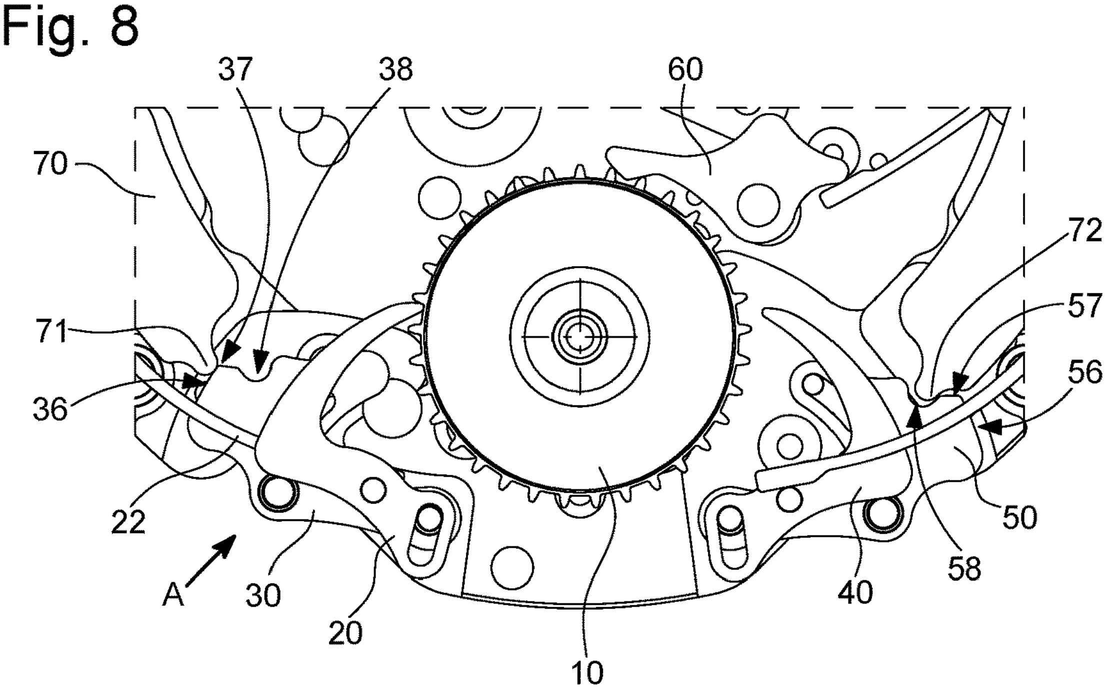
Figure 9:
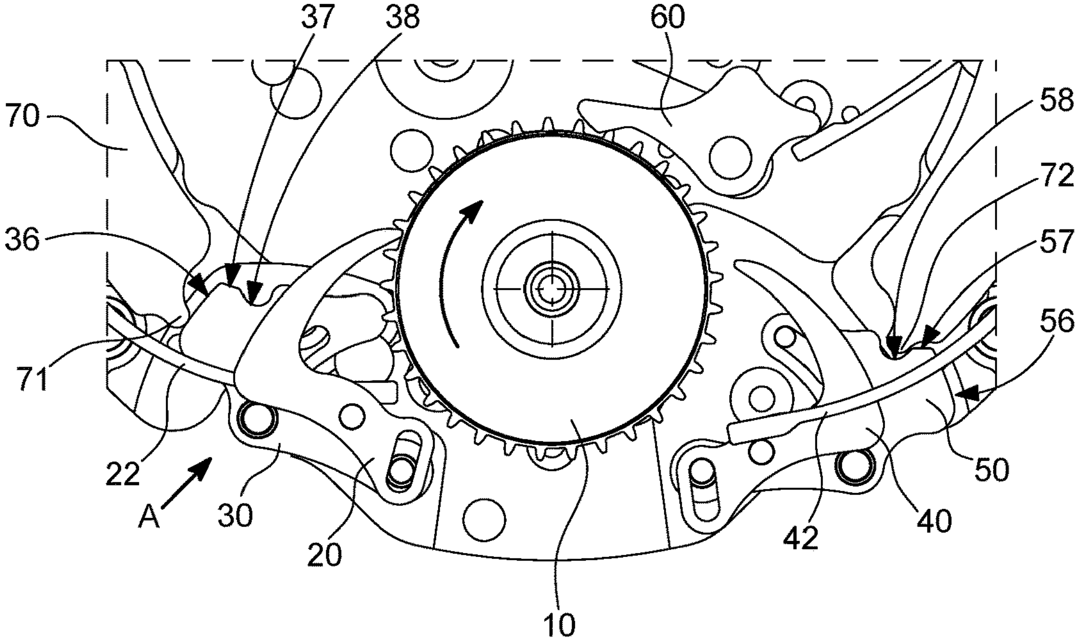

As shown in FIGS. 7 to 9, each manual corrector actuator 30, 50 comprises a first bearing profile 37, 57 configured to form a stop profile of the manual corrector actuator 30, 50, the first bearing profile 37, 57 being configured to cooperate respectively with a stop finger 71, 72 of the locking lever 70.

Each manual corrector actuator 30, 50 comprises a second bearing profile 36, 56 configured to form an escapement profile, or a sliding profile, on which the stop finger 71, 72 of the locking lever 70 slides, so as to allow a manual corrector actuator 30, 50 to at least partially rotate when the counteracting manual corrector actuator 30, 50 is not simultaneously actuated, as shown more particularly in FIGS. 8 to 9.

When the user operates the manual corrector actuators 30, 50, two cases can occur.

In the first case, as shown in FIG. 7, the manual corrector actuators 30, 50 are actuated simultaneously by the user. When the manual corrector actuators 30 and 50 are actuated simultaneously, they simultaneously come into contact with the stop fingers 71, 72 of the locking lever 70 at the first bearing profile 37, 57. Thus, the first bearing profiles 37, 57 simultaneously bear against a stop finger 71, 72 of the locking lever 70. As each manual corrector actuator 30, 50 exerts an opposite and identical action to the other on the locking lever 70 that is capable of moving in rotation, the locking lever 70 cannot rotate.

As a result of this simultaneous action on the two manual corrector actuators 30, 50, the only way to achieve a correction is to release one of the manual corrector actuators 30, 50 to allow the locking lever 70 to tip.

In this way, the locking lever mechanism prevents the two corrector beaks 29 and 49 from interacting with the correction wheel set 10 when they are activated at the same time by the user, via the manual corrector actuators 30, 50.

Advantageously, the stop fingers 71, 72 have an identical first shape and the first bearing profiles 37, 57 have an identical second shape such that the forces exerted on the locking lever 70 via the manual corrector actuators 30, 50 are substantially equivalent.

In the second case, as shown in FIG. 8, the user actuates only one of the manual corrector actuators 30, 50 at a time.

In the example embodiment shown in FIG. 8, the first manual corrector actuator 30 is actuated. As seen hereinabove, this first manual corrector actuator 30 actuates the corrector 20, which acts in the direction of a clockwise correction, until the corrector beak 29 comes into contact with a tooth 11 of the toothing of the correction wheel set 10.

The rotation of the manual corrector actuator 30 causes the first bearing profile 37 to make contact with the first finger 71 of the locking lever, then causes the locking lever 70 to rotate over its maximum travel.

Advantageously, the bearing profiles 37, 36 of the manual corrector actuator 30 are configured such that the maximum travel of the locking lever 70 is reached before the corrector beak 29 comes into contact with the toothing of the correction wheel set 10.

Once tilted, the locking lever 70 is held in the tilted position by the second bearing profile 36. In the tilted position, the distance between the locking lever 70 and the second manual corrector actuator 50 is very small, which prevents the rotation thereof and of the second corrector 40, and thus the actuation of the second manual corrector actuator 50 once the first manual corrector actuator 30 is engaged. A small amount of play can be possible.

If the user continues to push the first manual corrector actuator 30 until it abuts, as shown in FIG. 9, this action drives the correction wheel set in the clockwise direction. The locking lever 70 remains in the same tilted position by sliding along the second bearing profile 36, and prevents the rotation of the second manual corrector actuator 50. Thus, via the locking lever 70 acting as a safety lever, the two corrector beaks 29 and 49 cannot interact with the correction wheel set 10 at the same time, and no corrector is prioritised during the design phase.

Depending on the geometry and complexity of the mechanism, the manual corrector actuators 30, 50 can have a clearance 38, 58 to free up space opposite the fingers 71, 72 of the locking lever 70, thus allowing the locking lever 70 to be able to tilt and reach maximum travel.

Figure 11:
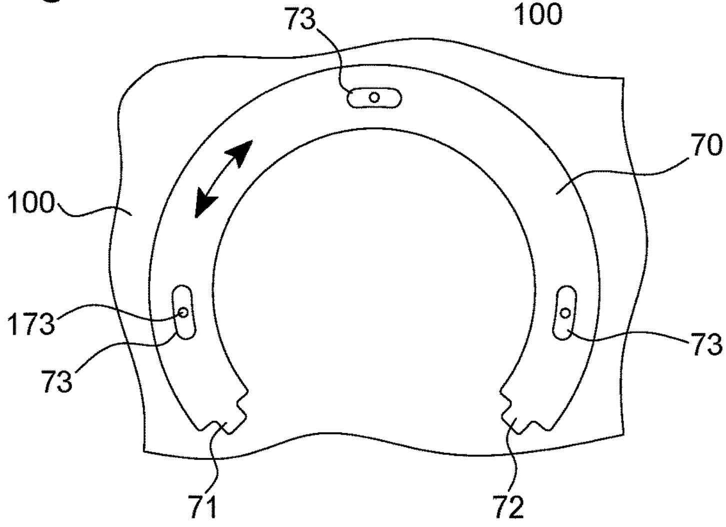
FIG. 11 diagrammatically shows a plan view of one example embodiment of a safety lever according to the invention with guidance by pins and oblong grooves.

In an alternative embodiment shown in FIG. 11, the locking lever 70 comprises lever guide grooves 73 cooperating with lever guide pins 173 carried by the plate 1 carrying the manual control device 100.

According to another alternative embodiment, the locking lever comprises lever pins which cooperate with lever pin guide grooves made in the plate 1 carrying the manual control device 100.

Figure 12:
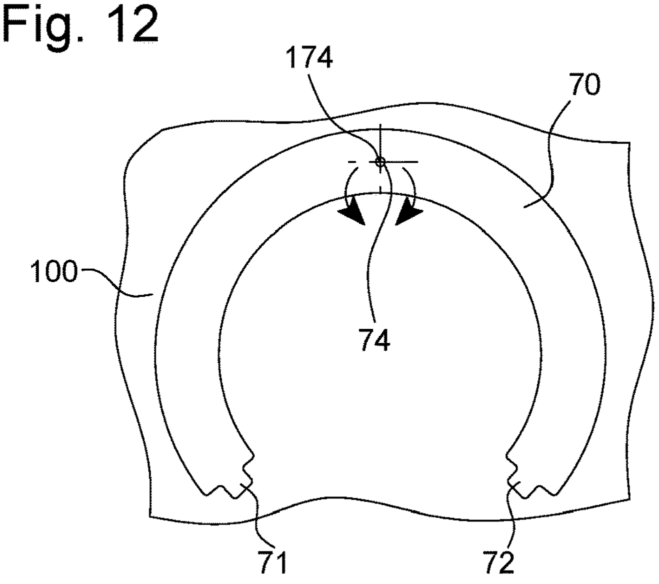
FIG. 12 diagrammatically shows a plan view of one example embodiment of a safety lever according to the invention that pivots.

According to another alternative embodiment shown in FIG. 12, the locking lever 70 is mounted such that it pivots about a shaft 174 mounted on the plate 1 carrying the manual control device 100.

In an alternative embodiment, the locking lever 70 and the manual corrector actuators 30, 50 are coplanar in the mechanism 500.

In an alternative embodiment, the locking lever 70 and the manual corrector actuators 30, 50 can be positioned in different planes of the mechanism 500 so as to facilitate the integration of the control device 100.

In an alternative embodiment, the locking lever 70 and the manual corrector actuators 30, 50 and/or the correctors 20, 40 associated therewith can be positioned in different parallel planes of the mechanism 500, so as to facilitate the integration of the control device 100.

In an alternative embodiment, the locking lever 70 can cooperate with manual corrector actuators 30, 50 positioned in two different and parallel planes of the mechanism 500.

The locking lever 70 can also be used to initiate one or more additional functions during the tilting of the locking lever 70. In particular, as shown in FIGS. 1 and 6, the locking lever 70 can comprise a coupling pin 74 integral with the movements of the locking lever 70. This coupling pin 74 is in particular arranged to move an additional wheel set, for example a coupling wheel set, to move a lever provided with an idler gear, to couple the correction mechanism with the hands of the timepiece, or to uncouple same, during the movement of the locking lever 70 initiated during a correction.

Figure 10:
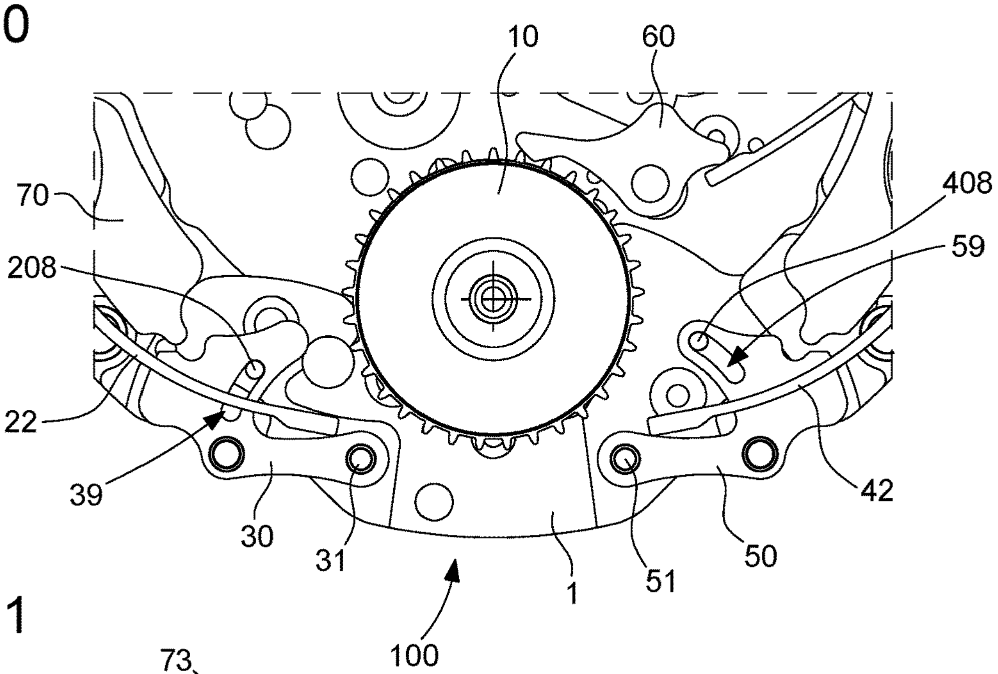
FIG. 10 diagrammatically shows a plan view, similar to FIG. 1, of a correction mechanism according to the invention in a rest position without the correctors so as to more specifically view the manual corrector actuators.

Each manual corrector actuator 30, 50 comprises a limiting member for limiting the angular travel. The manual control device 100 according to the invention has been shown with reference to FIG. 10 without the previously described correctors 20, 40 for better visibility. More particularly, the limiting member for limiting the angular travel is formed by a limiting groove 39, 59 made in the body of the manual corrector actuator 30, 40 and by a limiting pin 208, 408 carried by the plate 1 carrying the manual control device 100. The limiting groove 39, 59 cooperates with the limiting pin 208, 408 as follows: in the rest position, under the influence of the first elastic return means 22 or of the second elastic return means 42, the limiting groove 39, 59 bears against the limiting pin 208, 408 at a first end of the limiting groove 39, 59. The maximum rotational travel of the manual corrector actuator 30, 50 is defined by the second end of the limiting groove 39, 59 abutting against the limiting pin 208, 408 under the push initiated by the user.

The inactive rest position of each of the manual corrector actuators 30, 50 is outside the timepiece 1000. These manual corrector actuators 30, 50 thus remain within the reach of the user.

More particularly, the manual corrector actuators 30, 50 are actuated by means of push buttons provided in the middle (not shown) of the timepiece 1000.

The invention further relates to a timepiece 1000, comprising at least one mechanism 500, at least one correction wheel set 10 whereof is arranged to be controlled by at least one such manual control device 100.

By way of example, the mechanism 500 is a time zone mechanism and in such a case, the correction wheel set 10 is a time zone correction wheel.

By way of example, the mechanism 500 is a calendar mechanism and in such a case, the correction wheel 10 is a date wheel or ring.

The invention is applicable to many other horological mechanisms, for which an adjustment must be made or is advantageously made by the user, for example, in a non-limiting manner, the setting of a moon phase or age, tide status, leap year, day/night position, morning/evening position, manual counter, the selection of a striking mode, or the adjustment of an alarm time, or the like.

The invention claimed is:

1. A device for manually controlling a mechanism for a timepiece, comprising:

two counteracting manual corrector actuators, arranged to be operated by a user and to control one and the same correction wheel set in opposing movements, each of the two manual corrector actuators setting in motion an associated corrector having a beak which is configured to bear against a relief of said correction wheel set and to cause said correction wheel set to move when said manual corrector actuator is moved over its full path of travel under the action of the user, said manual control device comprises a locking lever mechanism arranged to prohibit an action of one of the two manual corrector actuators on said correction wheel set when the other of the two manual corrector actuators is engaged and interacting with said correction wheel set, wherein said locking lever mechanism comprises a locking lever configured to be driven in rotation during the engagement of one of the two manual corrector actuators, in order to limit the travel of the other of the two manual corrector actuators and to prevent the corrector associated therewith from accessing said correction wheel set, wherein each of the two manual corrector actuators pivots about a hinge pin, and wherein each associated corrector comprises an oblong guide groove cooperating with said hinge pin of the corresponding manual corrector actuator, said oblong groove being configured to guide the movement of said associated corrector during the pivoting of said corresponding manual corrector actuator.

2. The device for manually controlling a mechanism for a timepiece according to claim 1, wherein each of the two manual corrector actuators comprises an actuating stud which sets in motion said associated corrector by the pivoting of the corresponding manual corrector actuator about said hinge pin.

3. The device for manually controlling a mechanism for a timepiece according to claim 1, wherein said oblong groove is configured to guide said associated corrector, in rotation and translation, during the pivoting of said corresponding manual corrector actuator.

4. The device for manually controlling a mechanism for a timepiece according to claim 1, wherein at least one of the two manual corrector actuators comprises an angular travel limit member.

5. The device for manually controlling a mechanism for a timepiece according to claim 4, wherein the angular travel limit member is formed by a limiting groove made in a body of said at least one of the two manual corrector actuators and by a limiting pin carried by a plate carrying the manual control device.

6. The device for manually controlling a mechanism for a timepiece according to claim 1, wherein said locking lever constitutes a safety lever, said locking lever comprising a first end having a first stop finger and a second end, opposite the first end, which has a second stop finger, the first and the second stop fingers being configured to cooperate in abutment, respectively with a manual corrector actuator from among the two manual corrector actuators.

7. The device for manually controlling a mechanism for a timepiece according to claim 6, wherein the first stop finger and the second stop finger have an identical shape and/or carry out an identical function.

8. A device for manually controlling a mechanism for a timepiece, comprising:

two counteracting manual corrector actuators, arranged to be operated by a user and to control one and the same correction wheel set in opposing movements, each of the two manual corrector actuators setting in motion an associated corrector having a beak which is configured to bear against a relief of said correction wheel set and to cause said correction wheel set to move when said manual corrector actuator is moved over its full path of travel under the action of the user, said manual control device comprises a locking lever mechanism arranged to prohibit an action of one of the two manual corrector actuators on said correction wheel set when the other of the two manual corrector actuators is engaged and interacting with said correction wheel set, wherein said locking lever mechanism comprises a locking lever configured to be driven in rotation during the engagement of one of the two manual corrector actuators, in order to limit the travel of the other of the two manual corrector actuators and to prevent the corrector associated therewith from accessing said correction wheel set, wherein said locking lever constitutes a safety lever, said locking lever comprising a first end having a first stop finger and a second end, opposite the first end, which has a second stop finger, the first and the second stop fingers being configured to cooperate in abutment, respectively with a manual corrector actuator from among the two manual corrector actuators, and wherein each of the two manual corrector actuators comprises:

a first bearing profile configured to form a stop profile in cooperation with the first stop finger or the second stop finger and to prevent said manual corrector actuator considered from rotating;

a second bearing profile configured to form an escapement profile on which the first stop finger or the second stop finger slides so as to allow said manual corrector actuator considered to partially rotate.

9. The device for manually controlling a mechanism for a timepiece according to claim 8, wherein said first bearing profiles of the two manual corrector actuators are arranged relative to one another in a substantially aligned manner, and wherein the first stop finger and the second stop finger respectively bear against said first bearing profile of each of said two manual corrector actuators when each of said two manual corrector actuators are actuated simultaneously by the user.

10. The device for manually controlling a mechanism for a timepiece according to claim 8, wherein said second bearing profiles of said two manual corrector actuators are arranged opposing one another so as to form an acute angle with a vertex of the acute angle pointing towards the mechanism.

11. The device for manually controlling a mechanism for a timepiece according to claim 1, wherein said locking lever is in one piece.

12. The device for manually controlling a mechanism for a timepiece according to claim 1, wherein said locking lever is mounted such that it pivots about a shaft mounted on a plate carrying said manual control device.

13. The device for manually controlling a mechanism for a timepiece according to claim 1, wherein said locking lever and the two manual corrector actuators are coplanar.

14. The device for manually controlling a mechanism for a timepiece according to claim 1, wherein said two manual corrector actuators and/or the correctors associated therewith extend in two different parallel planes.

15. The device for manually controlling a mechanism for a timepiece according to claim 1, further comprising a first elastic return means and a second elastic return means, each of said elastic return means being configured to push one of the two manual corrector actuators back into an inactive rest position, the first elastic return means and/or said second elastic return means cooperating directly with an associated corrector.

16. A timepiece, comprising at least one mechanism, at least one correction wheel set of the timepiece is arranged to be controlled by at least one of the device according to claim 1.

17. The timepiece according to claim 16, wherein said correction wheel set is held in position by a jumper subjected to the action of at least one spring.

18. The timepiece according to claim 16, wherein said at least one mechanism is a time zone mechanism and wherein said correction wheel set is a time zone correction wheel, or in that said at least one mechanism is a calendar mechanism and wherein said correction wheel set is a date wheel or ring.

* * * * *